United States Patent
Wigren et al.

(10) Patent No.: US 9,485,614 B2
(45) Date of Patent: *Nov. 1, 2016

(54) METHOD AND ARRANGEMENT FOR POSITIONING IN WIRELESS COMMUNICATION SYSTEMS

(71) Applicant: TELEFONAKTIEBOLAGET L M ERICSSON (PUBL), Stockholm (SE)

(72) Inventors: Torbjörn Wigren, Uppsala (SE); Ari Kangas, Lidingö (SE)

(73) Assignee: TELEFONAKTIEBOLAGET L M ERICSSON, Stockholm (SE)

(*) Notice: Subject to any disclaimer, the term of this patent is extended or adjusted under 35 U.S.C. 154(b) by 0 days.

This patent is subject to a terminal disclaimer.

(21) Appl. No.: 14/425,379

(22) PCT Filed: Sep. 3, 2013

(86) PCT No.: PCT/SE2013/051026
§ 371 (c)(1),
(2) Date: Mar. 3, 2015

(87) PCT Pub. No.: WO2014/038999
PCT Pub. Date: Mar. 13, 2014

(65) Prior Publication Data
US 2015/0215733 A1    Jul. 30, 2015

Related U.S. Application Data

(60) Provisional application No. 61/696,551, filed on Sep. 4, 2012.

(51) Int. Cl.
| | | |
|---|---|---|
| H04W 24/00 | (2009.01) | |
| H04W 4/02 | (2009.01) | |
| G01S 5/00 | (2006.01) | |
| H04W 24/02 | (2009.01) | |

(52) U.S. Cl.
CPC ............. *H04W 4/02* (2013.01); *G01S 5/0036* (2013.01); *G01S 5/0081* (2013.01); *H04W 24/02* (2013.01)

(58) Field of Classification Search
CPC ............. H04W 72/046; H04W 28/18; H04W 36/0088; H04W 36/0072; H04W 36/0083; H04W 36/30; H04W 64/00; H04W 16/10; H04W 72/04; H04W 28/16; H04W 36/32; H04W 52/0203; H04W 52/0245; H04W 52/0258; H04W 72/1247; H04W 24/10; H04W 72/005; H04W 8/22; H04W 16/14; H04W 12/06; H04W 72/082; H04W 74/002; H04W 36/0061; H04L 5/001; H04L 5/14; H04L 5/0048; H04L 43/06; H04L 1/00; H04L 5/0035; H04L 5/00

See application file for complete search history.

(56) References Cited

U.S. PATENT DOCUMENTS

| | | | | |
|---|---|---|---|---|
| 5,175,867 | A * | 12/1992 | Wejke | .................. H04W 36/30 455/438 |
| 2011/0025561 | A1 | 2/2011 | Opshaug | |
| 2012/0082058 | A1* | 4/2012 | Gerstenberger | .. H04W 36/0083 370/252 |
| 2013/0021929 | A1* | 1/2013 | Kim | ...................... H04B 7/024 370/252 |

(Continued)

FOREIGN PATENT DOCUMENTS

| | | |
|---|---|---|
| EP | 1235076 A1 | 8/2002 |
| WO | 99/39517 A2 | 8/1999 |
| WO | 2011/016804 A1 | 2/2011 |

OTHER PUBLICATIONS

ETSI TS 125 433 V6.7.0; Universal Mobile Telecommunications System (UMTS); UTRAN Iub interface Node B Application Part (NBAP) signalling (3GPP TS 25.433 version 6.7.0 Release 6); Sep. 2005.

(Continued)

*Primary Examiner* — Nimesh Patel
(74) *Attorney, Agent, or Firm* — Patents on Demand P.A.; Brian K. Buchheit; Scott M. Garrett

(57) ABSTRACT

A method of improved positioning of a user equipment in a wireless communication network comprises receiving a positioning measurement from a user equipment in the wireless communication network and retrieving bandwidth reduction information. Further, the method includes detecting a deviation in the received position measurement based on the retrieved bandwidth reduction information, managing the received position measurement based on the detected deviation, and determining a position of the user equipment based at least on the managed received position measurement to provide improved positioning for the user equipment.

24 Claims, 10 Drawing Sheets

(56) References Cited

U.S. PATENT DOCUMENTS

| | | | |
|---|---|---|---|
| 2013/0155966 A1* | 6/2013 | Bekiares | H04W 28/16 370/329 |
| 2013/0208604 A1* | 8/2013 | Lee | H04L 25/0226 370/252 |

OTHER PUBLICATIONS

ETSI TS 125 331 V6.7.0; Universal Mobile Telecommunications System (UMTS); Radio Resource Control (RRC) protocol specification (3GPP TS 25.331 version 6.7.0 Release 6); Sep. 2005.

ETSI TS 123 032 V6.0.0; Digital cellular telecommunications system (Phase 2+); Universal Mobile Telecommunications System (UMTS); Universal Geographical Area Description (GAD)(3GPP TS 23.032 version 6.0.0 Release 6); Dec. 2004.

ETSI TS 125 133 V6.7.0; Universal Mobile Telecommunications System (UMTS); Requirements for support of radio resource management (FDD)(3GPP TS 25.133 version 6.7.0 Release 6); Sep. 2004.

ETSI TS 125 425 V6.0.0; Universal Mobile Telecommunications System (UMTS); UTRAN Iur interface user plane protocols for CCH data streams (3GPP TS 25.425 version 6.0.0 Release 6); Dec. 2003.

* cited by examiner

METHOD AND ARRANGEMENT FOR POSITIONING IN WIRELESS COMMUNICATION SYSTEMS

This application is a 371 of PCT/SE2013/051026, filed Sep. 3, 2013, which claims the benefit of U.S. Provisional Application No. 61/696,551, filed Sep. 4, 2012, the disclosures of which are fully incorporated herein by reference.

TECHNICAL FIELD

The proposed technology generally relates to positioning in wireless communication systems, and in particular to methods and arrangements for improved positioning accuracy during operation with reduced bandwidth in such systems.

BACKGROUND

In today's wireless communication systems, the demand for mobile location services is growing, both from consumers and from authorities. Location is a vital component in consumer services such as social media, search, advertising, and navigation. In the US, and many other countries, emergency positioning performance is a regulatory requirement. In the US, such E911 requirements are very important—loss of performance is not an option. In addition, mobile location can be used by authorities for road-traffic management and for machine-to-machine purposes.

Recently, some implementations of bandwidth reduction radio functionality have been presented. For example, one such functionality is reducing the WCDMA downlink (DL) bandwidth to 4.2 MHz, from 5 MHZ. The reason is that operators want to use a part of the WCDMA spectrum for GSM traffic, or other traffic if possible.

One consequence of the reduction in bandwidth on the downlink is that the DL filtering performed by the so-called RRC (Root-Raised Cosine) filter in the base band (BB) is altered, to narrow down the DL spectrum. Doing so, emission requirements still need to be maintained. Laws of nature then inevitably means an increase of side lobe levels in the time domain. This, in turn affect user equipment (UE) receivers in that their detection signal processing become more prone to false detections, detecting energy in a side lobe, instead of the desired main lobe.

Within current technology, this has affected one crucial positioning measurement, namely the so-called UE RxTx type 1 measurement. Lab trials show that this measurement becomes biased due to occurrence of side lobes; therefore, the calculated distance between the radio base station (RBS) and the UE can become negative when the UE is close to the base station. This results in a failure of Round Trip Time (RTT) positioning, which in turn deteriorates the overall positioning performance.

Consequently, there is a need for enabling improved positioning during bandwidth reduction induced errors in the position measurements.

SUMMARY

It is an object to provide methods and arrangements that alleviate some or all of the previously described problems with known solutions.

This and other objects are met by embodiments of the proposed technology.

According to a first aspect, there is provided a method of improved positioning of a user equipment in a wireless communication network. The method includes the step of receiving a positioning measurement from the user equipment in the wireless communication network, and the step of retrieving bandwidth reduction information. Further, the method includes the step of detecting a deviation in the received position measurement based on the retrieved bandwidth reduction information, and the step of managing the received position measurement based on the detected deviation, and the step of determining a position of the user equipment based at least on the managed received position measurement, to provide improved positioning for the user equipment.

According to a second aspect, there is provided a positioning arrangement in a wireless communication system. The arrangement includes a receiver configured for receiving a positioning measurement from a user equipment in the wireless communication system, and a retriever unit configured for retrieving bandwidth reduction information. Further, the arrangement includes a deviation unit configured for checking the received positioning measurement for a deviation based on the retrieved bandwidth reduction information. Finally, the arrangement includes a managing unit configured for managing the received position measurement based on the deviation, and a positioning unit configured for determining a position of the user equipment based at least on the managed received position measurement, to provide improved positioning for the user equipment.

Further, a network node and computer program including the above described functionality and arrangement are provided.

An advantage of the proposed technology is improved positioning during bandwidth reduction induced errors in the position measurements.

Other advantages will be appreciated when reading the detailed description.

BRIEF DESCRIPTION OF THE DRAWINGS

The embodiments, together with further objects and advantages thereof, may best be understood by referring to the following description taken together with the accompanying drawings, in which.

DETAILED DESCRIPTION

Figure 1:
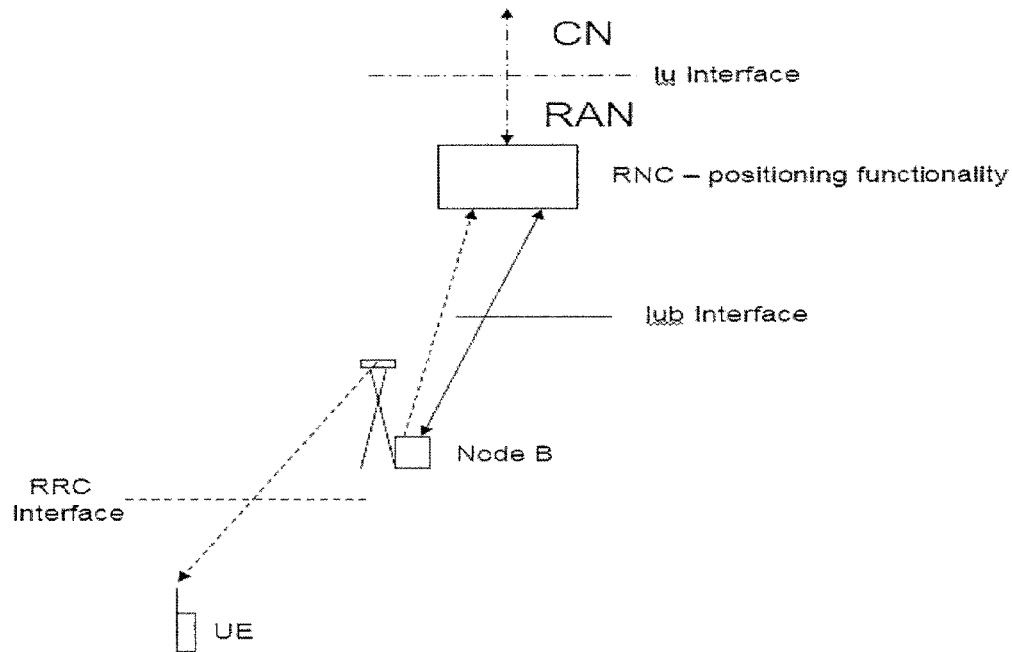
FIG. 1 is an illustration of a wireless communication network in which the current technology can be implemented.

Throughout the drawings, the same reference numbers are used for similar or corresponding elements. Although the present disclosure mainly exemplifies bandwidth reduction with reductions from 5 to 4.2 MHz, it is evident that the same effect is present for reductions between other frequencies and size of bandwidth reductions as well. In the case of having multiple fractions e.g. the spectrum divided into multiple bands of reduced bandwidth of the total bandwidth, the deviation in the positioning measurement might occur for each fraction.

As used herein, the term "wireless device" may refer to a User Equipment, UE, a mobile phone, a cellular phone, a Personal Digital Assistant, PDA, equipped with radio communication capabilities, a smart phone, a laptop or Personal Computer, PC, equipped with an internal or external mobile broadband modem, a tablet PC with radio communication capabilities, a portable electronic radio communication device, a sensor device equipped with radio communication capabilities or the like. In particular, the term "UE" should be interpreted as a non-limiting term comprising any device equipped with radio circuitry for wireless communication according to any relevant communication standard.

As used herein, the term "radio network node" or simply "network node" may refer to base stations, network control nodes, and the like. In particular, the term "base station" may encompass different types of radio base stations including standardized base stations such as Node Bs, or evolved Node Bs, eNBs, and also macro/micro/pico radio base stations, home base stations, also known as femto base stations, relay nodes, repeaters, radio access points, and even radio control nodes controlling one or more Remote Radio Units, RRUs, or the like.

As mentioned in the background, a reduction in bandwidth (in the frequency domain) will necessarily cause a widening of the spectrum in time as well as an increase in the number of side lobes. Further, the side lobes will have larger amplitude than the corresponding side lobes for the original bandwidth.

An example of a situation when bandwidth reduction comes into play is co-use of the same spectrum by multiple radio access technologies. In order to enable a more efficient use of existing spectrum e.g. to fit both GMS and UMTS within the same channel, it has been discussed to divide or section the available bandwidth into a plurality of sub-bands. Thereby, typically the majority of the bandwidth is still used for e.g. UMTS, whereas a small sub-band is reserved for GSM. For each reduction in an available bandwidth, more side lobes will appear in the corresponding time domain and positioning of user equipments will be increasingly flawed. This is of course also happening when combining other RATs than GSM and UMTS in a same spectrum.

Based on the above, the inventors have identified the need for a solution which takes the error caused by the widening of the time spectrum into account and manages positioning measurements and calculations based on knowledge about the bandwidth reduction induced deviation or distortion of the side lobes.

In order to support the understanding of the benefits and implications of the current disclosure, a detailed description of current positioning in wireless communication systems will be described below.

WCDMA Positioning Architecture

For WCDMA, the 3GPP standardizes two positioning architectures for control plane positioning, namely Radio Network Control (RNC) centric architecture and Stand Alone SMLC (SAS) centric architecture. User plane round trip time (RTT) positioning is not possible in WCDMA since the RTT measurement is not available in the UE.

The so-called RNC centric architecture is depicted in FIG. 1. In this architecture:

The RNC is the node where most if the positioning functionality is located. The RNC receives positioning requests form the core network (CN), determines which positioning method to use to serve the request, orders measurements to be performed by the radio base station (RBS) or the UE, computes the location of the UE, and reports the result back to the CN.

The nodeB performs certain position related measurements like the RTT measurement.

The UE performs certain position related measurements like the UE RxTx type 1 measurement.

Figure 2:
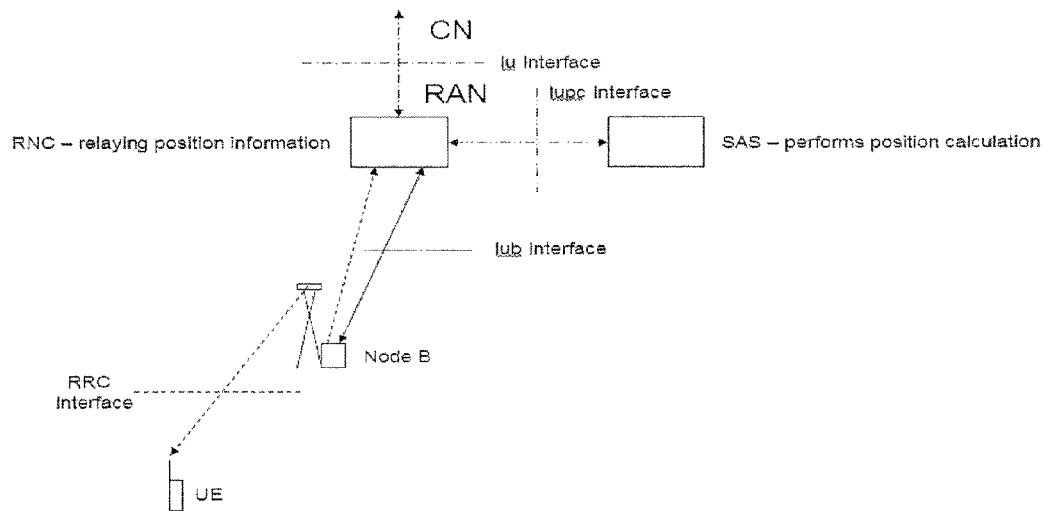
FIG. 2 is an illustration in another wireless communication network in which the current technology can be implemented.

The other architecture is the so-called SAS centric architecture depicted in FIG. 2. In this architecture most of the positioning functionality is taken over by the broken out SAS node, leaving the RNC as a measurement and positioning reporting relay node. Otherwise, the functionality is the same. FIG. 1 and FIG. 2 also depict the interfaces standardized by the 3GPP.

Single Leg RTT Positioning
Measurements

The RTT distance computation relies on two measurements, the RTT measurement performed in the RBS and the UE RxTx type 1 measurement performed in the user equipment.

The RTT measurement has an accuracy of ½ chip (39 m) and a resolution of 1/16 chip (5 m). The range is 876.000 . . . 2923.8750 chips and the report values over Iub and Iur are 0-32767. This functionality supports extended range. The RTT measurement in the RBS measures the time between the beginning of a downlink WCDMA frame and the reception of the corresponding uplink frame.

The UE RxTx type 1 measurement measures the latency in the user equipment between reception of the beginning of a downlink frame and the transmission of the beginning of the corresponding uplink frame. The measurement has an accuracy of 1.5 chips and a resolution of 1 chip. The range is 768-1280 chips, corresponding to the reported values.

Configured Cell Descriptions

Exactly as for the cell ID positioning method, an RTT positioning method exploits cell polygons to describe the extension of each cell of the cellular system. The WCDMA polygon format consist of a list of 3-15 corners, each corner being represented by an encoded latitude and longitude, in the WGS 84 system. When connected by line segments, the corners define a cell polygon, which represents the cell boundary. Certain rules apply; line segments between corners are e.g. not allowed to cross.

The cell polygons can be computed by coverage computation tools, which account for cell layout and topographical information. It is essential to understand that the cell polygons are statistical descriptions. This means that there is a certain probability that the user equipment is actually located within the reported cell polygon. This is known as the confidence value.

RTT Positioning Sequence

Figure 3:
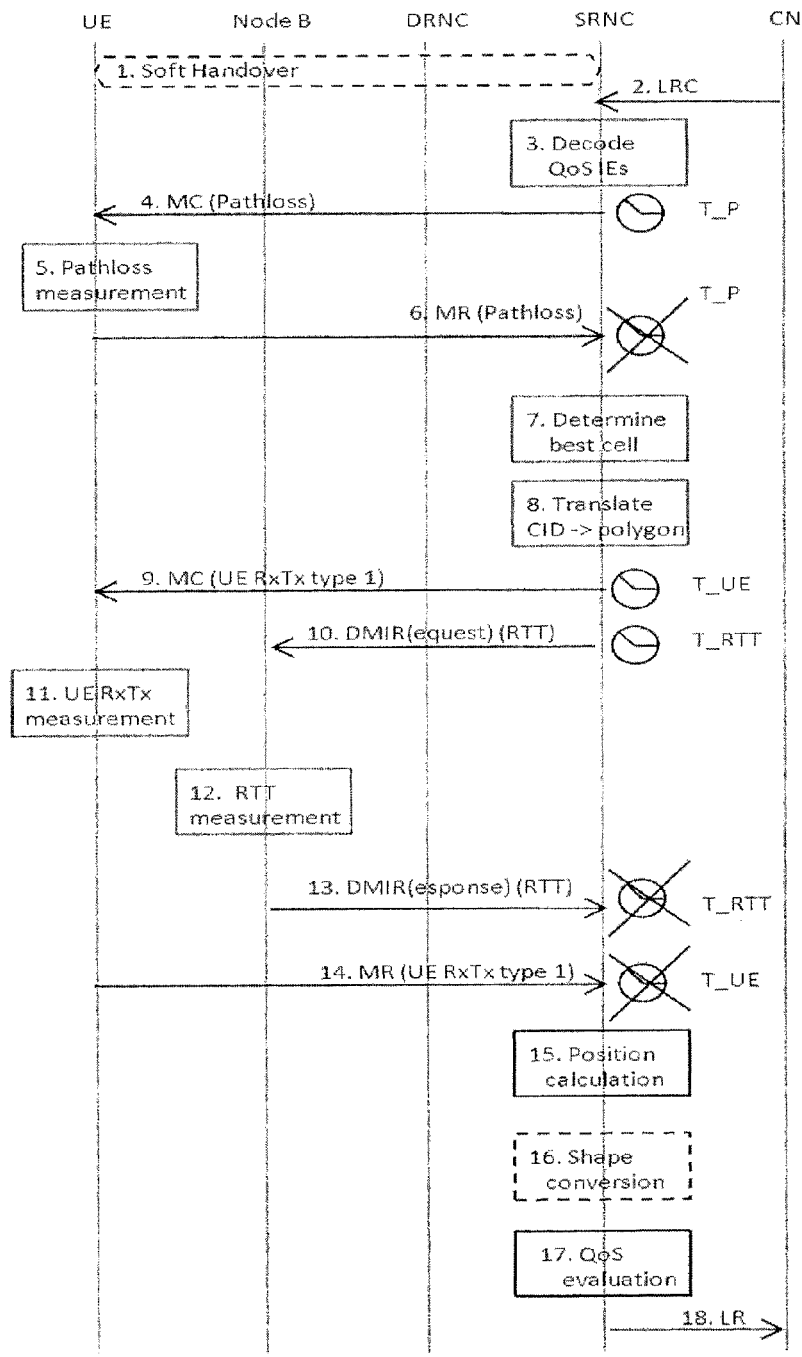
FIG. 3 is a signaling chart illustrating a positioning procedure in which the current technology can be implemented.

The RTT positioning sequence is displayed in FIG. 3. The sequence may start with the user equipment (UE) being in soft handover (1) (dashed indicates "optional"). The serving RNC (SRNC) receives a positioning request from the core network (CN) in a LOCATION REPORTING CONTROL message over the Iu interface (2). The SRNC decodes the message and stores the QoS information elements (IEs), namely response time, horizontal accuracy and vertical accuracy (3). It is assumed that RTT positioning is selected based on the requested QoS. When the UE is in soft handover the best cell for single leg RTT positioning is determined as the cell of the active set with the smallest path loss. Therefore, a MEASUREMENT CONTROL message may be sent to the UE (4). The timer T_P supervises the measurement. The UE performs the path loss measurements for the cells in the active set (5), and reports the result in two MEASUREMENT REPORT messages (6), of which the second is used to get the right filtering time. The SRNC then determines the best cell (7) and fetches the cell polygon corresponding to the selected cell ID (8). The SRNC then orders the two measurements needed for RTT positioning, the UE RxTx type 1 measurement (9) using a MEASUREMENT CONTROL message over RRC, and the RTT measurement (10) using a DEDICATED MEASUREMENT INITIATION REQUEST message over Iub, possibly relayed over Iur. The timers T_UE and T_RTT supervise the measurements that are then performed by the UE (11) and the RBS (12). The results are reported back in a DEDICATED MEASUREMENT INITIATION RESPONSE message (13) and a MEASUREMENT REPORT message (14). The SRNC proceeds by the position calculation (15) which is described below. Following that step, a conversion of the ellipsoid arc reporting format to another shape may be performed (16). The sequence then evaluates the obtained QoS (17) and terminates after reporting the result back to the CN in a LOCATION REPORT message over Iu (18).

Ellipsoid Arc Computation

Decoding

Cell polygons, antenna positions, the RTT measurement, and the UE RxTx type 1 measurement first needs decoding. When describing this, the subscript enc denotes an encoded quantity. Starting with the configured antenna position, the latitude $\theta^A$ and longitude $\phi^A$ are obtained as follows, $$\theta^A = (1 - 2(\text{sign(latitude)})_{enc}^A)\theta_{enc}^A \frac{\pi}{2^{24}} \tag{1}$$

$$\varphi^A = \varphi_{enc}^A \frac{\pi}{2^{23}} \tag{2}$$

Here $(\text{sign(latitude)})_{enc}^A$ equals 0 in the Northern hemisphere and 1 in the Southern hemisphere. The latitudes $\theta_i^P$ and longitudes $\phi_i^P$ of the configured cell polygon corners are obtained in the same way, i.e.

$$\theta_i^P = (1 - 2(\text{sign(latitude)})_{enc,i}^P)\theta_{enc,i}^P \frac{\pi}{2^{24}}, i = 1, \ldots, N^P \tag{3}$$

$$\varphi_i^P = \varphi_{enc,i}^P \frac{\pi}{2^{23}}, i = 1, \ldots, N^P \tag{4}$$

The number of polygon corners are denoted $N^P$. The decoding of the RTT measurement, RTT, is obtained as $$RTT = \left(\frac{RTT_{enc}}{16} + 875.968\right)T_{chip} \tag{5}$$

$T_{chip}=1/3840000$ s is the chipping time. The division by 16 follows since the resolution of the measurement is 1/16 chip. The decoding of the UE RxTx type 1 measurement, RxTx, follows as $$RxTx = RxTx_{enc}T_{chip} \tag{6}$$

In case measurement values on the range limits are obtained, the measurement is declared a failure and the RTT positioning method is terminated.

Coordinate Transformations

The calculation of the offset and included angles of the ellipsoid arc format needs to be performed in a Cartesian, earth tangential coordinate system. The latitude and longitudes of the antenna position and cell polygon are therefore transformed to such a system, with the origin located in the antenna coordinates of the RBS. A transformation from WGS 84 geodetic latitudes and longitudes to an Earth Centered Earth Fixed (ECEF) system is first performed. Such coordinates are denoted with the subscript ECEF. After that the transformation to the Earth tangential east-north(-up) system, marked with the subscript ET, can be performed.

Consider the following transformation from geodetic coordinates to Earth Centered Earth Fixed (ECEF) Cartesian coordinates, $$N^A = \frac{a}{\sqrt{1 - e^2(\sin(\theta^A))^2}} \tag{7}$$

$$x_{ECEF}^A = N^A \cos(\theta^A)\cos(\varphi^A) \tag{8}$$

$$y_{ECEF}^A = N^A \cos(\theta^A)\sin(\varphi^A) \tag{9}$$

$$z_{ECEF}^A = \left(\frac{b}{a}\right)^2 N^A \sin(\theta^A) \tag{10}$$

$$N_i^P = \frac{a}{\sqrt{1 - e^2(\sin(\theta_i^P))^2}}, i = 1, \ldots, N^P \tag{11}$$

$$x_{ECEF,i}^P = N_i^P \cos(\theta_i^P)\cos(\varphi_i^P), i = 1, \ldots, N^P \tag{12}$$

$$y_{ECEF,i}^P = N_i^P \cos(\theta_i^P)\sin(\varphi_i^P), i = 1, \ldots, N^P \tag{13}$$

$$z_{ECEF,i}^P = \left(\frac{b}{a}\right)^2 N_i^P \sin(\theta_i^P), i = 1, \ldots, N^P \tag{14}$$

In (7)-(14), a is the major axis of the WGS 84 Earth ellipsoid, b is the minor axis, and e is the eccentricity.

The polygon corner coordinates can now be transformed to the Earth Tangential system, with the origin in the antenna of the RBS and with east and north axes. Geometrical considerations give the following equations, $$x_{ET,i}^P = -\sin(\phi^A)(x_{ECEF,i}^P - x_{ECEF}^A) + \cos(\phi^A)(y_{ECEF,i}^P - y_{ECEF}^A), i=1,\ldots,N^P \tag{15}$$

$$y_{ET,i}^P = -\sin(\theta^A)\cos(\phi^A)(x_{ECEF,i}^P - x_{ECEF}^A) - \sin(\theta^A)\sin(\phi^A)(y_{ECEF,i}^P - y_{ECEF}^A) + \cos(\theta^A)(z_{ECEF,i}^P - z_{ECEF}^A), i=1,\ldots,N^P \tag{16}$$

Distance Calculation

The inner radius of the ellipsoid arc can then be calculated. Since the combined one way nominal accuracy of the RTT and UE RxTx type 1 measurement is 1 chip, the inner radius is adjusted to a value ½ chip less than the measured value. With denoting the speed of light, the inner radius $R_{ET}$ is:

$$R_{ET} = (RTT - RxTx - T_{chip})\frac{c}{2} \quad (17)$$

Due to measurement errors, negative radii or distance may occur. Such results are typically modified to zero unless they are below a threshold, in which case a measurement failure is declared and the RTT positioning method is terminated.

No measurement of the thickness of the ellipsoid arc, $\Delta R_{ET}$, is available in the standard. Therefore this quantity is computed from a configurable uncertainty time, $T_{\Delta R_{ET}}$ [chips], determined by the field trial results, and from an upper bound on the drift between the uplink and the downlink (the measurement of RTT in the RBS and the measurement of RxTx in the UE are not synchronized). Hence, the time difference between these two measurements multiplied with the maximum drift rate between the uplink and the downlink results in an upper bound on the drift in chips. The maximum drift rate is specified to be $1.25^{chips}/s$. The time difference between the two measurements can be obtained by sampling of the timers $T_{UE}$ and $T_{RTT}$ as $$\Delta R_{ET} = (T_{\Delta R_{ET}} + 1.25|T_{RIT} - T_{UE}|)\frac{cT_{chip}}{2} \quad (18)$$

Ellipsoid Arc Calculation—Fusion with Cell Polygon

Figure 4:
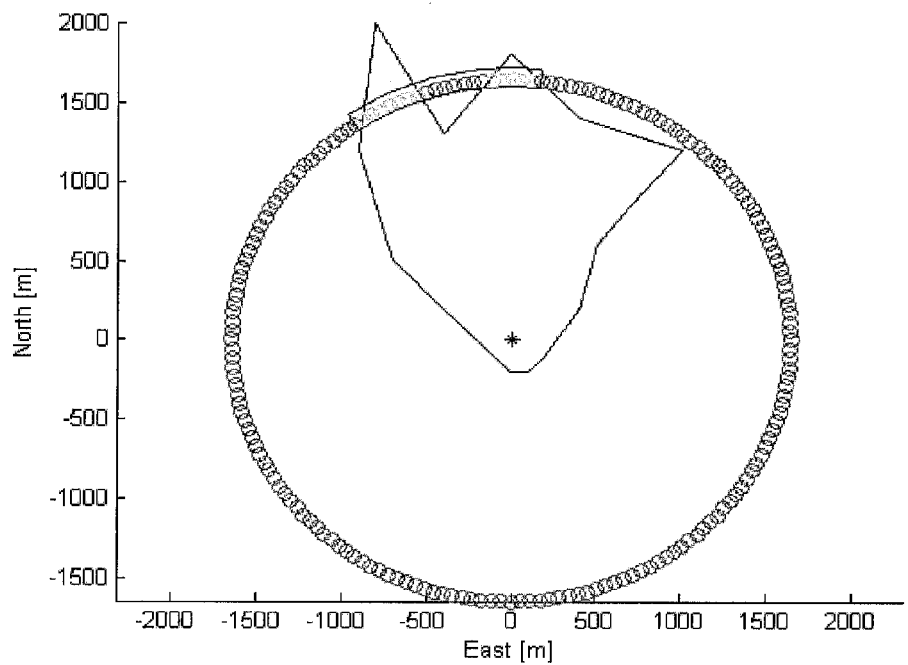
FIG. 4 is an illustration of the principle of fusion of cell polygons.

The RBS antenna center point, the inner radius and the thickness of the ellipsoid arc are now computed. This defines a region denoted a circular strip that extends 360 deg around the RBS, as illustrated in FIG. 4. It then remains to compute the offset angle, $\gamma_{ET}$, and the included angle, $\delta_{ET}$, that determine the lateral extension of the ellipsoid arc. $\gamma_{ET}$ is defined to be the angle, also shown in FIG. 4, counted clockwise from north to the point where the circular strip intersects the cell polygon. $\delta_{ET}$ is counted clockwise from the offset angle, to the point where the circular strip stops intersecting the cell polygon.

To compute $\gamma_{ET}$ and $\delta_{ET}$ test points are distributed uniformly within the circular strip. The number of test points is 180, corresponding to the 2 degree angular quantization. Next, for each test point, it is checked if it is in the interior of the cell polygon. The test exploits a test ray from the test point to infinity parallel to the east axis of the coordinate system. The test is based on the fact that for test points in the interior, the cell polygon must be intersected an odd number of times, when the test ray moves from the test point to infinity. Formally, an assumption that the polygon is compact (finite) is also needed. The crossings with the polygon boundary are easily determined by checking for intersections between the test ray, and the line segments between two adjacent cell polygon corner points. The algorithm described below assumes that the first and last polygon corner points are the same (duplicated). For this reason (15) and (16) are augmented with $x_{Et,N^P+1} = x_{Et,1}^P$ and $y_{ET,N^P+1}^P = y_{ET,1}^P$. To explain the algorithm, the intersection between the horizontal ray $y=y_0, x \geq x_0$, and the line segment between the corners with index i and i+1 of the cell polygon, is given by the solution (if it exists) to the Equation 19 below $$\binom{x}{y_0} = a\binom{x_{ET,i+1}^P}{y_{ET,i+1}^P} + (1-\alpha)\binom{x_{ET,i}^P}{y_{ET,i}^P}, x \geq x_0, 0 \leq \alpha \leq 1 \quad (19)$$

The solution to this equation, with a test point $(x_{test,k}, y_{test,k})^T$, k=1, ..., 180 replacing the left hand side, and with consideration of the two constraints, renders an intersection if it exists. Repetition of this procedure for all line segments between corners hence allows for a count of the number of intersections for one specific test point. The complete procedure is summarized by the following Algorithm (20), where $l_k$ denotes the number of intersections for test point k, and where $inside_k$ is a Boolean that is true if test point with index k is in the interior of the cell polygon, $$x_{test,k} = \left(R_{ET} + \frac{cT_{chip}}{2}\right)\sin\left((k-1)\frac{2\pi}{180}\right), k=1,\ldots,180 \quad (20)$$

$$y_{test,k} = \left(R_{ET} + \frac{cT_{chip}}{2}\right)\cos\left((k-1)\frac{2\pi}{180}\right), k=1,\ldots,180.$$

for $k = 1$ to 180

$l_k = 0$ for $i = 1$ to $N^P$ if $y_{ET,i}^P = y_{ET,i+1}^P$ – modify if segment is horizontal $y_{ET,i+1}^P = y_{ET,i+1}^P + 0.01$ end $\alpha_{k,i} = \frac{y_{test,k} - y_{ET,i}^P}{y_{ET,i+1}^P - y_{ET,i}^P}$ $\bar{x} = x_{ET,i}^P + \alpha_{k,i}(x_{ET,i+1}^P - x_{ET,i}^P)$ if $(\bar{x} - x_{test,k} > 0) \& (0 \leq \alpha < 1)$ – check constraints $l_k = l_k + 1$ end end if $(l_k \bmod 2 = 1)$ – check if $l_k$ is odd $inside_k = $ 'true' end ...

The algorithm (20) above hence marks each test point as interior or exterior to the cell polygon. In order to find the sought angles, a search is then performed for the largest set of adjacent test points that are exterior to the cell polygon. The complement to this set constitutes the set of test points that defines the ellipsoid arc. Note that this procedure handles the case with more than one intersection between the circular strip and the cell polygon, as shown in FIG. 4. There is also special handling of cases where there is no intersection, then a 360 degree ellipsoid arc results. The result is summarized in the offset angle $\omega_{offset}$, and the included angle $\omega_{included}$.

For clarity's sake, FIG. 4 illustrates the principle of fusion of the cell polygon, with the measured RTT distance and uncertainty. The star represents the radio base station and the polygon represents the cell polygon. The indicated arc intersecting the cell polygon represents the computed ellipsoid arc, and the circles outside the computed ellipsoid arc comprise test points in the circular strip. Finally, the circles within the computed ellipsoid arc and within the polygon comprise test points found to be in the interior of the cell polygon.

Encoding

The encoding is performed as shown in Equation 21-29 below $$ellipsoidArc(1) = 10 - \text{shape code} \quad (21)$$

$$ellipsoidArc(2) = (\text{sign}(\text{latitude}))\lambda_{enc}^A \quad (22)$$

$$ellipsoidArc(3) = \theta_{ecn}^A \quad (23)$$

$$ellipsoidArc(4) = \varphi_{enc}^A \quad (24)$$

$$ellipsoidArc(5) = \max\left(\min\left(\text{floor}\left(\frac{R_{ET}}{5}\right), 65535\right), 0\right) \quad (25)$$

$$ellipsoidArc(6) = \min\left(\text{floor}\left(\frac{{}^{10}\log\left(1 + \frac{\Delta R_{ET}}{10}\right)}{{}^{10}\log(1.1)}\right), 128\right) \quad (26)$$

$$ellipsoidArc(7) = \max\left(\text{floor}\left(\frac{\omega_{offset}}{2}\right), 0\right) \quad (27)$$

$$ellipsoidArc(8) = \max\left(\text{floor}\left(\frac{\omega_{included}}{2}\right), 0\right) \quad (28)$$

$$ellipsoidArc(9) = \text{Confidence} \quad (29)$$

WCDMA BW Reduction Effects

Figure 5:
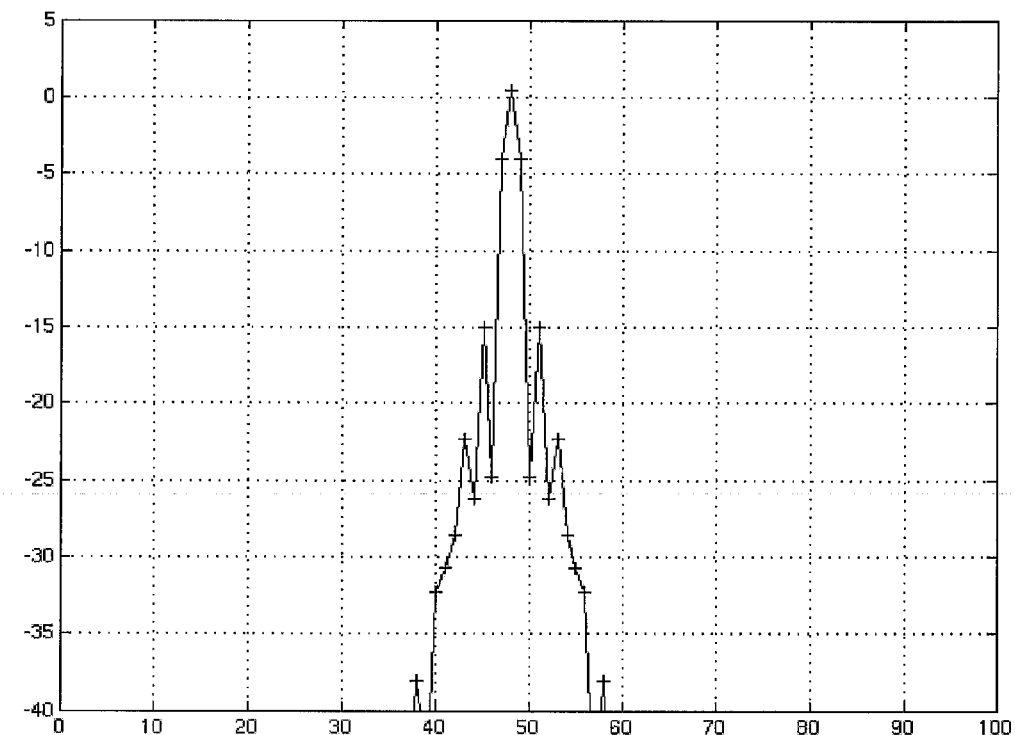
FIG. 5 illustrates time domain characteristics of a RRC filter for 5.0 MHZ WCDMA DL bandwidth.
Figure 6:
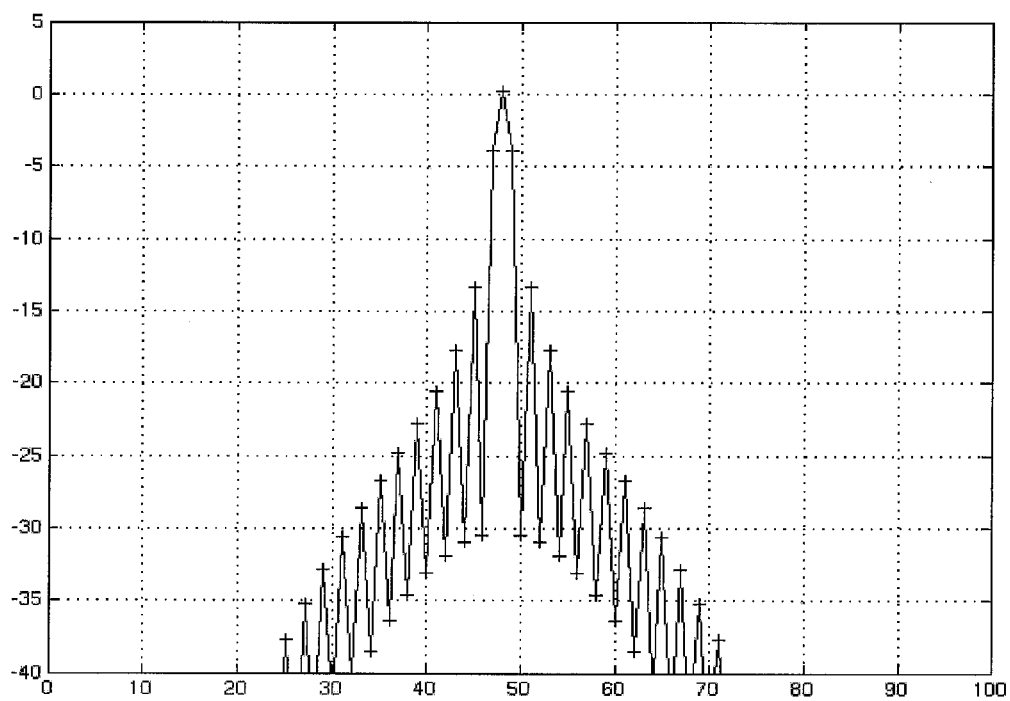
FIG. 6 illustrates time domain characteristics for an RRC filter for 4.2 MHz WCDMA DL bandwidth.

WCDMA BW reduction is simple in principle in the DL. The transmit RRC filter is simply redesigned to concentrate the RBS transmission to a more narrow frequency band. The consequence, obvious to anyone familiar with standard Fourier analysis and as mentioned previously, is that the filter side lobes are affected in the time domain. Typically, a filter BW reduction result in enlarged side lobes in the time domain. This is illustrated in FIG. 5 and FIG. 6 that shows the filter in the time domain, for 5 and 4.2 MHz, respectively.

The previously mentioned problem can now be understood. As seen in FIG. 6, there is now a side lobe approximately 3.5 chips beside the main lobe, that is about 2 dB higher than the corresponding side lobe of FIG. 5. Furthermore, a large number of additional side lobes appear beside the first side lobe.

This means that spurious signal energy due to e.g. random noise may appearing 3-4 chips beside the main lobe, has a higher chance of being detected as a piece of first arriving signal energy in the UE. This higher chance is very significantly higher since UE RxTX type 1 positioning thresholds in UE BB processing are set to detect the first signal energy arriving. The consequence can therefore be a much higher probability to detect the downlink transmission 3-4 chips before the actual signal energy arrive at the UE.

This in turn means that the UE RxTX type 1 measurement (measuring the latency between arrival of a downlink radio frame and the transmission of the next uplink radio frame) becomes 3-4 chips too large. This is exactly what is observed in lab measurements.

TABLE 1

5.0 MHz measurements and RTT positioning results in the lab.

| RTT | UE RxTx type 1 | reportedInnerRadius |
|---|---|---|
| 2363 | 1025 | 0 m (success) |
| 2363 | 1025 | 0 m (success) |
| 2350 | 1026 | 0 m (success) |
| 2346 | 1025 | 0 m (success) |

TABLE 1-continued 5.0 MHz measurements and RTT positioning results in the lab.

| RTT | UE RxTx type 1 | reportedInnerRadius |
|---|---|---|
| 2348 | 1025 | 0 m (success) |
| 2347 | 1025 | 0 m (success) |

TABLE 2

4.2 MHz measurements and RTT positioning results in the lab.

| RTT | UE RxTx type 1 | reportedInnerRadius |
|---|---|---|
| 2397 | 1029 | −204 m (failure) |
| 2399 | 1029 | −199 m (failure) |
| 2396 | 1025 | 0 m (success) |
| 2399 | 1026 | 0 m (success) |
| 2398 | 1029 | −201 m (failure) |
| 2396 | 1025 | 0 m (success) |

Hence, the UE RxTx type 1 measurement becomes biased due to side lobes, therefore the distance between the radio base station (RBS) and the UE becomes negative when the UE is close to the base station. This results in a failure of RTT positioning, which in turn deteriorates the overall positioning performance.

In a basic embodiment, upon receiving a position measurement directly or indirectly from a user equipment a positioning node also retrieves any information relating to bandwidth reduction or quantization in the cell of the user equipment. The received position measurement is then managed based on at least the retrieved bandwidth reduction information. The management can comprise managing the actual received position measurement, or any measure derived from the received position measurement. Finally, the position of the user equipment is determined based on the now managed position measurement.

Figure 7:
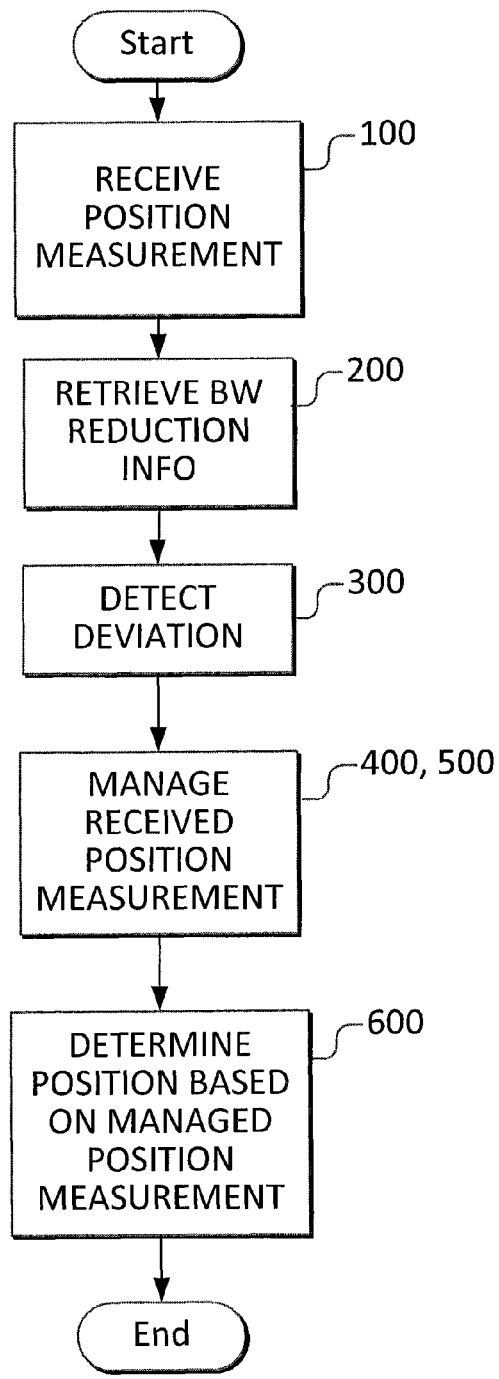
FIG. 7 illustrates a flow of an embodiment of a method according to the current disclosure.

With reference to FIG. 7, an embodiment of a method of improved positioning of a user equipment in a wireless communication system in the presence of a bandwidth reduction will be described. The system can be a RNC centric positioning architecture or a SAS centric positioning architecture, or similar. Initially, a positioning measurement is received in step 100 from a user equipment in the wireless communication network. Subsequently, or at the same time, bandwidth reduction information is retrieved in step 200. Based on the retrieved bandwidth reduction information, a deviation in the received position measurement is detected or checked for in step 300. Then, the received position measurement is managed in step 400, 500 based at least on the detected deviation and the retrieved bandwidth reduction information. Finally, the position of the user equipment is calculated in step 600 based at least on the managed received position measurement, to provide improved positioning for the user equipment.

The managing step 400, 500 can comprise affecting the actual received positioning measurement or provide information to the final positioning calculation step 600 which enables calculating a more accurate position for the user equipment.

According to a further embodiment, the method can be summarized as follows, where modifications to the known RTT position calculation function in the RNC or the SAS node are made so that it:

Retrieves information relating to BW reduction of the DL.
Checks for UE RxTx type 1 measurement deviations corresponding to side lobes of the DL transmit filter, when not in soft/softer handover.

Corrects the UE RxTx type 1 measurement, said correction being sensitive to the value of the Ue RxTx type 1 measurement relative to the expected side lobe locations, when not in soft/softer handover.

Modifies a threshold that checks when an RTT distance is considered to be too negative to be valid, said threshold being dependent on the expected side lobe locations of the DL transmit filter, when not in soft/softer handover.

Figure 8:
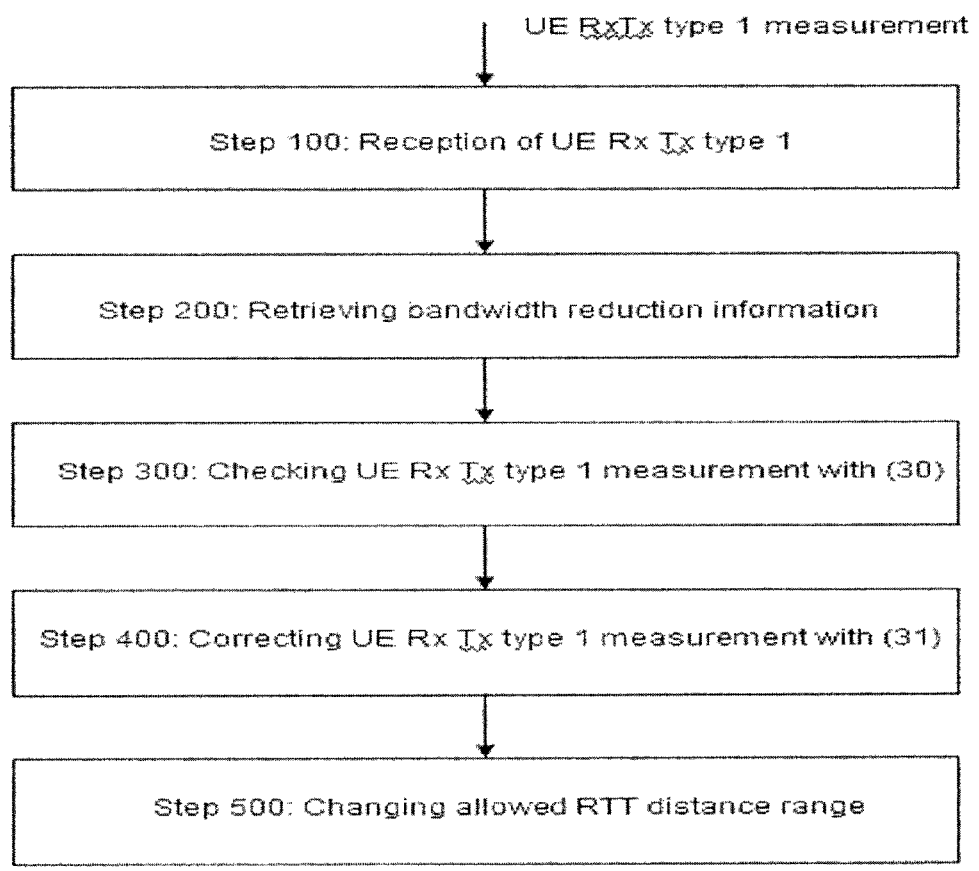
FIG. 8 illustrates a flow chart of a further embodiment of a method according to the current disclosure.
Figure 9:
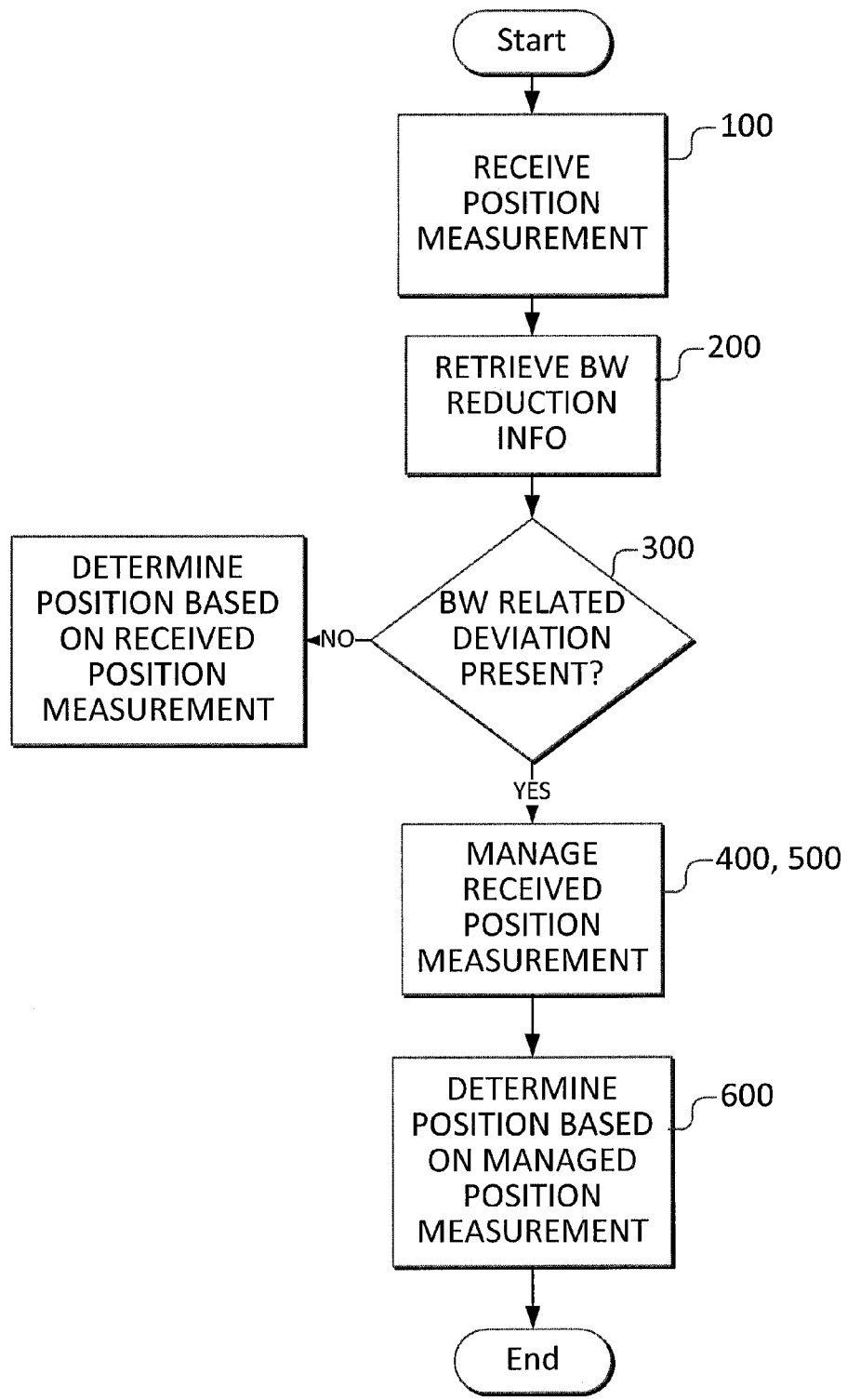
FIG. 9 illustrates a flow chart of a further embodiment of a method according to the current disclosure.

In particular, a flow chart of the steps of a method for UE RxTx type 1 measurement handling with bandwidth reduction safety nets appears in FIGS. 8 and 9. The flow chart starts in step 100 by the reception of a UE RxTx type 1 measurement in the positioning node. In step 200, the positioning node retrieves the bandwidth reduction information, including a subset of a Boolean indication that bandwidth reduction is applied, the value of the bandwidth reduction, tables of T values, threshold values, correction values and allowed negative radii, for different allowed bandwidth reductions. In step 300, the signaling step (30) in FIG. 3 is checked to see if a measurement deviation consistent with the bandwidth reduction is present. If that is the case, the positioning node may either in step 400 correct the UE RxTx type 1 measurement, or in step 500 modify the allowed negative radius in the position calculation function.

As illustrated in the further flow chart of the embodiment in FIG. 9, if no bandwidth related deviation in the received positioning measurement is detected the position of the user equipment is determined based on the received positioning measurement in a normal fashion. It is only if a bandwidth related deviation is detected that the steps of the current disclosure are necessitated and activated.

BW Reduction Information Retrieval

The fact that BW reduction is applied first needs to be retrieved by the positioning node, i.e. the RNC or the SAS node, depending on which architecture is used. At least the following information needs to be retrieved:

The fact that BW reduction is in effect for the DL of a specific cell.

The BW used in the cell, with BW reduction applied, typically in MHz.

The information may be retrieved from configured information in the positioning node, or received by signaling from another network node, like an OSS node. The bandwidth reduction information can comprise for example a subset of a Boolean indication that bandwidth reduction is applied, the value of the bandwidth reduction, tables of T values, threshold values, correction values and allowed negative radii, for different allowed bandwidth reductions. The bandwidth reduction information consequently serves both to indicate that bandwidth reduction is present and to what extent the bandwidth has been reduced, as well as to provide information which enables the step of detecting that a received positioning measurement deviates from a nominal value due to the bandwidth reduction, and any other information which can support and improve the accuracy of the positioning of the user equipment.

UE RxTx Type 1 Measurement Deviation Check

As illustrated by FIG. 6, the UE RxTx type 1 measurement deviation can be expected to occur as a too early detection of the time of arrival of a radio frame edge of the DL transmission in the UE. In case the first side lobe of the DL transmit RRC filter is T chips ahead of the main lobe, then it can be expected that measurements are clustered around The nominal value of the UE RxTx type 1 measurement corresponding to the main lobe of the DL RRC transmit filter, when the UE is not in soft/softer handover. This value is normally 1024, granularity is 1 chip, actually all UEs steer towards this value.

The first side lobe of the DL RRC transmit filter, when the UE is not in soft/softer handover, i.e. around 1024+T. This seems to correspond to a value of 1028-1029, cf. FIG. 6, granularity is 1 chip.

Higher side lobes may come into play, for very high values of the BW reduction.

According to a particular embodiment, said detecting step 300 detects a deviation if the absolute value of the deviation of the received position measurement is below a predetermined threshold.

The UE RxTx type 1 measurement deviation check step 300 therefore declares a measurement deviation consistent with BW reduction, if $$abs(RxTx-T-1024)<\text{threshold}, \quad (30)$$

where threshold denotes a positive quantity, typically not larger than 1 chip. Here both the quantity T and the threshold are dependent on the size of the bandwidth reduction. They may be represented as a table with an entry for each allowed value of the bandwidth reduction, which table is provided in the retrieved bandwidth reduction information or implemented as a default in the network node or positioning arrangement in the network node.

The above-mentioned nominal value 1024 for the position measurement is shown as a non-limiting example. It is evident that the Equation 30 above can be adapted to any nominal value Consequently, the detecting step 300 comprises determining a deviation in the received position measurement according to Equation 31 illustrated below $$abs(RxTx-T-RxTx_{nom})<\text{threshold} \quad (31)$$

where RxTx is the position measurement, T is the number of chips between a first side lobe and a main lobe of a radio frame, $RxTx_{nom}$ is a nominal value for the position measurement without bandwidth reduction, and at least one of T and the threshold depend on the retrieved bandwidth reduction.

Figure 10:
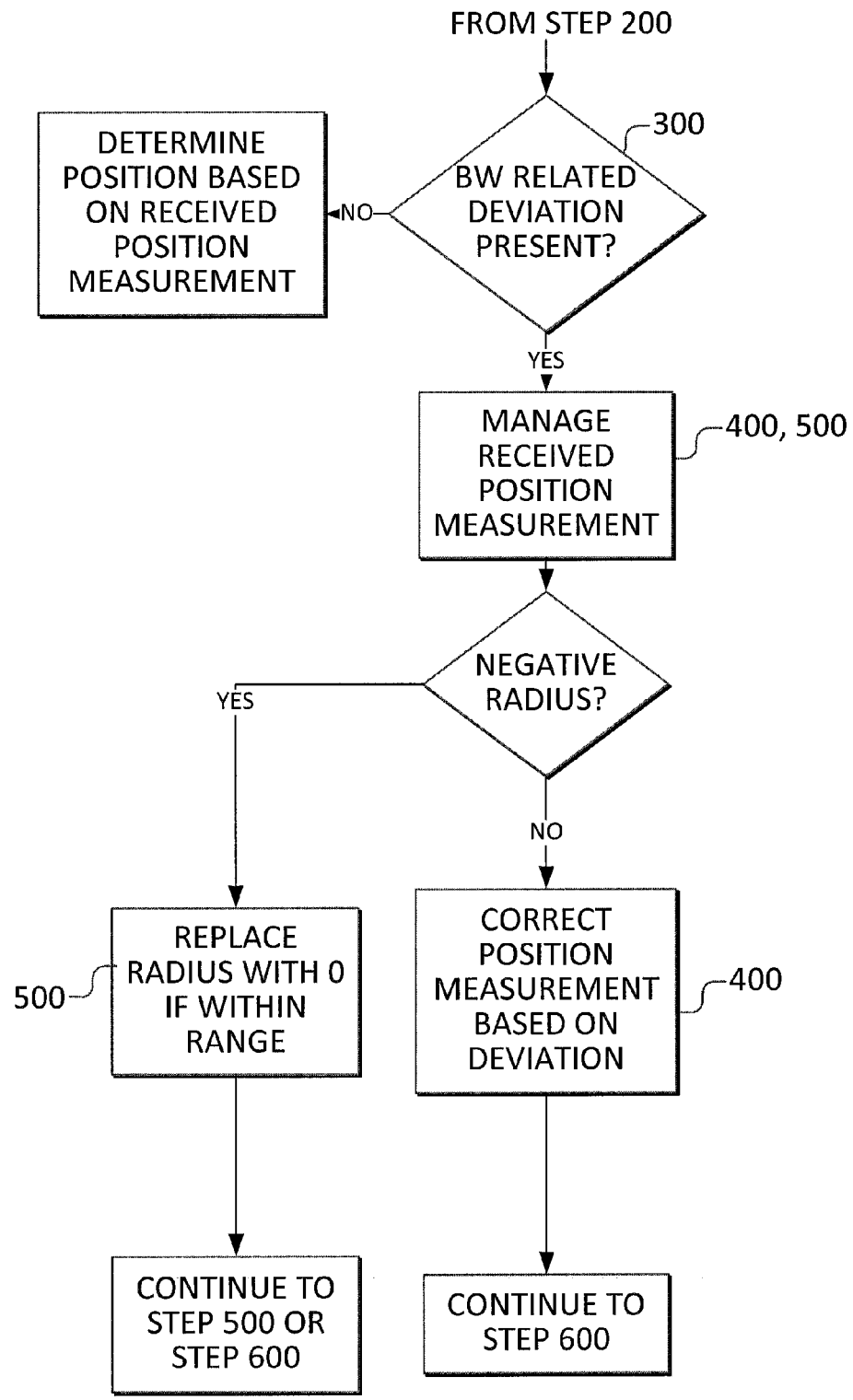
FIG. 10 illustrates a flow chart of an additional embodiment of a method according to the current disclosure.

According to a further embodiment, with reference to FIG. 10, the step of managing the received position measurement comprises correcting in step 400 the received position measurement to compensate for the detected bandwidth induced deviation, and/or adapting 500 a negative radius or distance based on the retrieved bandwidth reduction. Both managing steps 400, 500 will be described further below.

UE RxTx Type 1 Measurement Deviation Correction

In case a UE RxTx type 1 measurement deviation consistent with a specific BW reduction is declared by (30), one option is to correct the measurement, i.e., to replace the measured UE RxTx type 1 measurement according to Equation 32

$$RxTx:=RxTx+\text{correction} \quad (32)$$

where the term correction denotes a correction in chips, that may be dependent of the bandwidth reduction. It may be represented as a table with one entry for each allowed value of the bandwidth reduction.

According to another embodiment, the managing step 400, 500 includes an adaptation step 500, which can be used by itself or together with the previously described correction step 400. The adaptation step 500 includes allowing or adapting a detected negative distance value corresponding to a detected deviation in the position measurement step, based on the retrieved bandwidth reduction and the detected deviation. In this manner, a negative radius or distance value caused by the reduced bandwidth is not discarded as an error, but can be used to determine the position of the user equipment.

According to a further embodiment, the adapting step 500 comprises replacing a negative distance value received in the position measurement with 0 if the negative distance value is within a predetermined range or below/above a predetermined threshold.

UE RxTx Type 1 Negative Radius Threshold Setting

As an alternative to the UE RxTx type 1 measurement deviation correction, it is possible to enlarge the allowed values of the RTT radius corresponding to the UE RxTx type 1 measurement, in case a UE RxTx type 1 measurement deviation consistent with a specific BW reduction is declared by Equation 30. This amounts to allowing a negative bandwidth dependent radius, in the position calculation function. This would mean that in case a negative radius is obtained that is within the allowed range, it is replaced with 0 radius.

It is also possible to combine the UE RxTx type 1 measurement deviation correction by the bandwidth reduction dependent allowed negative radius.

Figure 11:
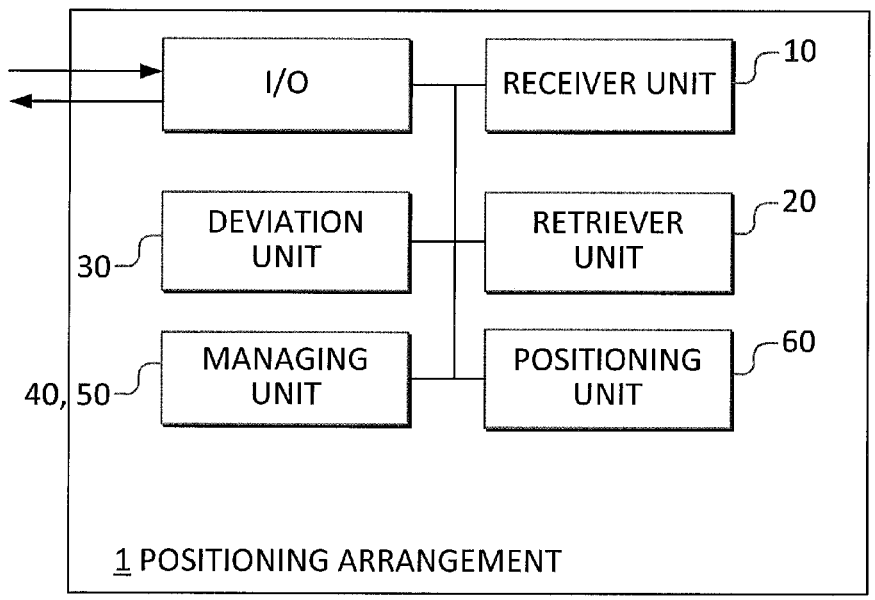
FIG. 11 illustrates an embodiment of an arrangement according to the current disclosure.

With reference to FIG. 11, an embodiment of a positioning arrangement 1 will be described. The apparatus is a positioning arrangement 1 in a wireless communication system, and comprises a receiver unit 10 configured for receiving a positioning measurement from a user equipment in the wireless communication network, and a retriever unit 20 configured for retrieving bandwidth reduction information relevant for the user equipment. Further, the arrangement 1 includes a deviation unit 30 configured for checking the received positioning measurement for a deviation based on the retrieved bandwidth reduction information, and a managing unit 40, 50 configured for managing the received position measurement based on the deviation and the retrieved bandwidth reduction information. Finally, the arrangement 1 includes a position unit 60 configured for determining a position for the user equipment based at least on the managed received position measurement, to provide improved positioning for the user equipment. Any functionality for receiving and transmitting signals to and from the arrangement 1 is illustrated by the generic input/output I/O box in FIG. 11.

According to a further embodiment, the managing unit 40, 50 comprises a correction unit 40 configured for correcting the received position measurement based on a determined deviation, and an adapting unit 50 configured for adapting allowed distance values based on the retrieved bandwidth reduction information and the deviation.

Figure 12:
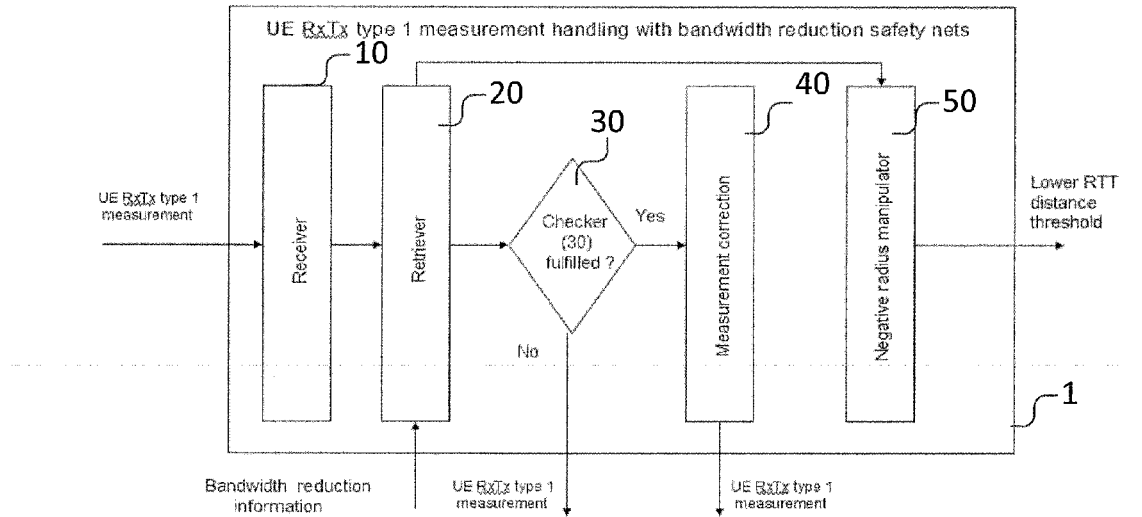
FIG. 12 illustrates a further embodiment of an arrangement according to the current disclosure.

According to a further particular embodiment, with reference to FIG. 12, the arrangement comprises an apparatus that is capable of performing UE RxTx type 1 measurement handling with bandwidth reduction safety nets. The apparatus comprises a UE RxTx type 1 measurement receiver 10, a BW reduction information retriever unit 20, a UE RxTx type 1 measurement deviation checker unit 30 that is sensitive to the retrieved bandwidth reduction information. Further, the apparatus comprises a UE RxTx type 1 measurement correction unit 40, and a negative radius manipulator unit 50, both sensitive to the retrieved bandwidth reduction information.

Another embodiment (not shown) comprises a network node, which is configured to provide the above-described functionality, preferably by including a positioning arrangement 1 according to the above-described embodiments. As stated previously the network node can comprise a RAN node as in FIG. 1 or a SAS node as in FIG. 2, or some other node that handles the positioning in a wireless communication system. The network node may also include radio circuitry for communication with one or more other nodes, including transmitting and/or receiving information.

It will be appreciated that the methods and devices described above can be combined and re-arranged in a variety of ways.

For example, embodiments may be implemented in hardware or in software for execution by suitable processing circuitry.

The steps, functions, procedures, modules, and/or blocks described above may be implemented in hardware using any conventional technology, such as discrete circuit or integrated circuit technology, including both general-purpose electronic circuitry and application-specific circuitry.

Particular examples include one or more suitably configured digital signal processors and other known electronic circuits, e.g. discrete logic gates interconnected to perform a specialized function, or Application Specific Integrated Circuits (ASICs).

Alternatively, at least some of the steps, functions, procedures, modules, and/or blocks described above may be implemented in software such as a computer program for execution by suitable processing circuitry including one or more processing units. Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs) or one or more Programmable Logic Controllers (PLCs).

The flow diagram or diagrams presented above may therefore be regarded as a computer flow diagram or diagrams, when performed by one or more processors. A corresponding apparatus may be defined as a group of function modules, where each step performed by the processor corresponds to a function module. In this case, the function modules are implemented as a computer program running on the processor.

It should also be understood that it may be possible to re-use the general processing capabilities of any conventional device or unit in which the proposed technology is implemented. It may also be possible to re-use existing software, e.g. by reprogramming of the existing software or by adding new software components.

Figure 13:
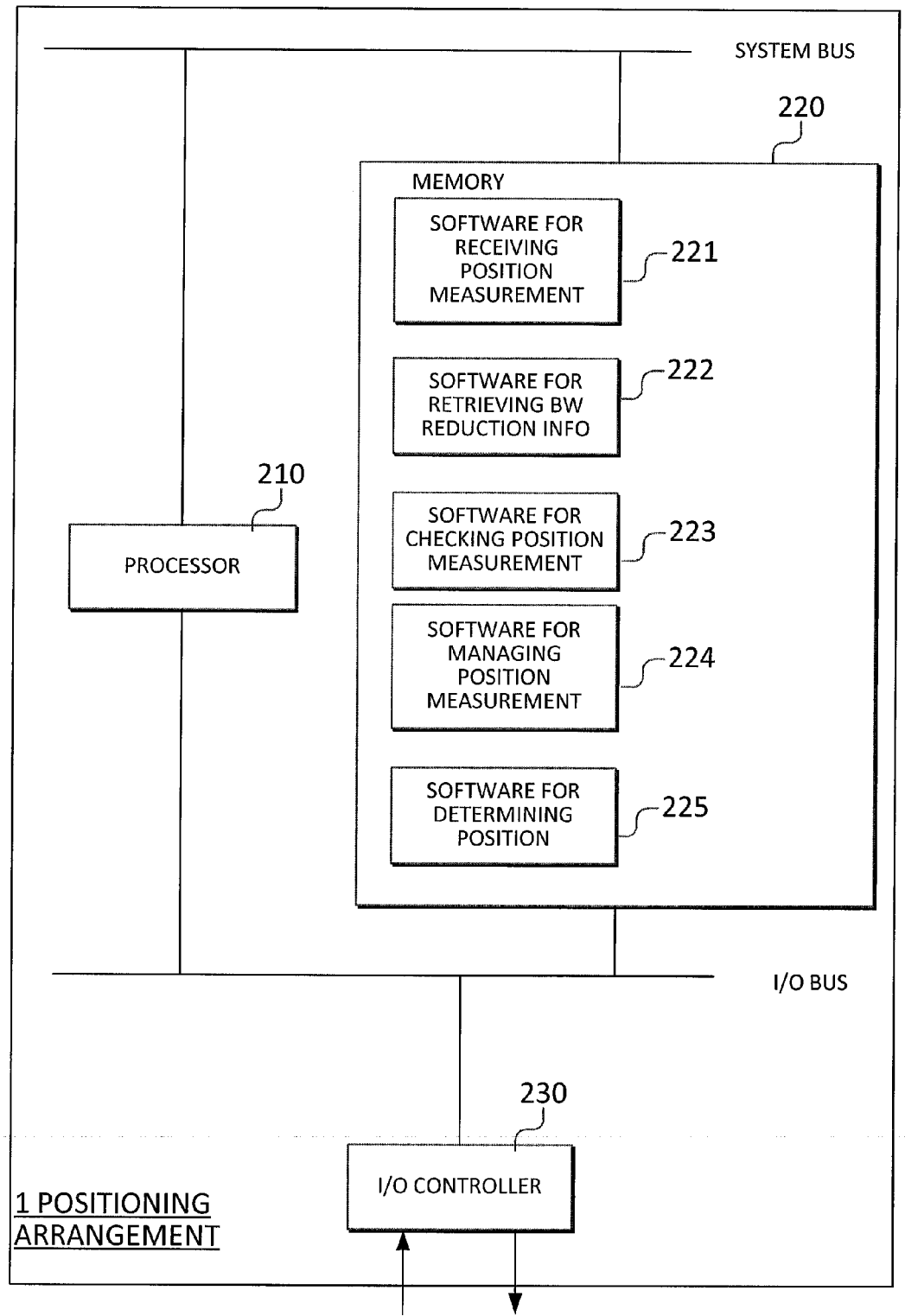
FIG. 13 illustrates a computer implementation of an arrangement according to the current disclosure.

In the following, an example of a computer implementation will be described with reference to FIG. 13. The positioning arrangement 1 comprises processing circuitry such as one or more processors and a memory. In this particular example, at least some of the steps, functions, procedures, and/or blocks described above are implemented in a computer program, which is loaded into the memory for execution by the processing circuitry. The processing circuitry and memory are interconnected to each other to enable normal software execution. An optional input/output device may also be interconnected to the processing circuitry and/or the memory to enable input and/or output of relevant data such as input parameter(s) and/or resulting output parameter(s).

In the following, an example of a computer implementation will be described with reference to FIG. 13. The positioning arrangement 1 comprises processing circuitry such as one or more processors 210 e.g. a microprocessor, which executes a software component 221 for receiving position measurements from a user equipment, and a software component 222 for retrieving bandwidth reduction information. Further, the arrangement 1 includes a software component 223 for checking the received position measurement for a deviation based on the retrieved bandwidth reduction information. In addition, the arrangement 1 includes a software component 224 for managing the received position measurement, and a software component 225 for determining a position for the user equipment based on the retrieved position measurement, the bandwidth reduction information, and the deviation check. These software components are stored in a memory 220. In this particular example, at least some of the steps, functions, procedures, and/or blocks described above are implemented in a computer program, which is loaded into the memory for execution by the processing circuitry. The processing circuitry 210 and memory 220 are interconnected to each other to enable normal software execution. An optional input/output device might also be interconnected to the processing circuitry and/or the memory to enable input and/or output of relevant data such as input parameter(s) and/or resulting output parameter(s). The processor 210 communicates with the memory over a system bus. A signal is received by an input/output (I/O) controller 230 controlling an I/O bus, to which the processor 210 and the memory 220 are connected. In this embodiment, the signal received by the I/O controller 230 is stored in the memory 220, where it is processed by the software components. Software component 221 might implement the functionality of the position measurement receiving step 100 in the embodiment described with reference to FIG. 9. Software component 222 might implement the functionality of the bandwidth information retrieving step 200, also with reference to FIG. 9. Further, software component 223 might implement the functionality of the bandwidth related deviation check step 300, also with reference to FIG. 9. In addition, software component 224 might implement the functionality of the position measurement managing step 400, 500 described with reference to FIG. 9. Finally, software component 225 might implement the functionality of the position determining step 600, with reference to FIG. 9.

The I/O unit 230 might be interconnected to the processor 210 and the memory 220 via an I/O bus to enable input and/or output of relevant data such as input parameters and/or resulting output parameters.

The term 'computer' should be interpreted in a general sense as any system or device capable of executing program code or computer program instructions to perform a particular processing, determining or computing task.

The software or computer program may be realized as a computer program product, which is normally carried or stored on a computer-readable medium. The computer-readable medium may include one or more removable or non-removable memory devices including, but not limited to a Read-Only Memory (ROM), a Random Access Memory (RAM), a Compact Disc (CD), a Digital Versatile Disc (DVD), a Universal Serial Bus (USB) memory, a Hard Disk Drive (HDD) storage device, a flash memory, or any other conventional memory device. The computer program may thus be loaded into the operating memory of a computer or equivalent processing device for execution by the processing circuitry thereof.

For example, the computer program stored in memory includes program instructions executable by the processing circuitry, whereby the processing circuitry is able or operative to execute the above-described steps, functions, procedure, and/or blocks.

The positioning arrangement 1 is thus configured to perform, when executing the computer program, well-defined processing tasks such as those described above.

The computer or processing circuitry does not have to be dedicated to only execute the above-described steps, functions, procedure, and/or blocks, but may also execute other tasks.

As an implementation example, the current discloser can beneficially be used in so-called fractional UMTS where GSM and UMTS can be allocated fractions of the full available bandwidth, thus causing each fraction to suffer from the increased side lobe levels as described in the current disclosure.

The advantages of the invention include:
Enhanced availability of single-leg RTT positioning.
Enhanced accuracy of single-leg RTT positioning.
Enhanced performance of positioning solutions.

The embodiments described above are merely given as examples, and it should be understood that the proposed technology is not limited thereto. It will be understood by those skilled in the art that various modifications, combinations and changes may be made to the embodiments without departing from the present scope as defined by the appended claims. In particular, different part solutions in the different embodiments can be combined in other configurations, where technically possible.

The invention claimed is:

1. A method of improved positioning of a user equipment performed by a positioning node in a wireless communication network, the method comprising:
    receiving a positioning measurement from a user equipment in said wireless communication network;
    retrieving bandwidth reduction information, wherein the bandwidth reduction information is retrieved from information configured in the positioning node or received by signaling from another node in the wireless communication network;
    detecting a deviation in said received position measurement based on said retrieved bandwidth reduction information;
    managing said received position measurement based on said detected deviation; and
    determining a position of said user equipment based at least on said managed received position measurement, to provide improved positioning for said user equipment.

2. The method according to claim 1, wherein said detecting step detects a deviation if the absolute value of the deviation of the received position measurement is below a predetermined threshold.

3. The method according to claim 2, wherein said detecting step comprises determining a deviation in said received position measurement if $$abs(RxTx - T - RxTx_{nom}) < \text{threshold}$$

where RxTx is the position measurement, T is the number of chips between a first side lobe and a main lobe of a radio frame, $RxTx_{nom}$ is a nominal value for the position measurement without bandwidth reduction, and at least one of T and the threshold depends on the retrieved bandwidth reduction.

4. The method according to claim 1, wherein said managing step comprises the step of correcting said received position measurement based on said retrieved bandwidth reduction information and said detected deviation.

5. The method according to claim 3, wherein said correcting step comprises applying a correction term to said retrieved position measurement based on said retrieved bandwidth extension information.

6. The method according to claim 4, wherein said correcting step is based on $$RxTx = RxTx + correction.$$

7. The method according to claim 1, wherein said managing step comprises the step of adapting allowed distance values of said received position measurements based on said retrieved bandwidth reduction information and said detected deviation.

8. The method according to claim 7, wherein said adapting step comprises replacing a negative distance value received in said position measurement with 0 if said negative distance value is within a predetermined range.

9. The method according to claim 1, wherein said received positioning measurement comprising a latency between reception of a beginning of a downlink frame in a user equipment and the transmission of the beginning of a corresponding uplink frame.

10. The method according to claim 9, wherein said received positioning measurement comprises a UE RxTx type 1 measurement.

11. The method according to claim 1, wherein said bandwidth reduction information comprises at least an indication of a bandwidth reduction in the downlink for a particular cell, and a value of a reduced bandwidth.

12. The method according to claim 11, wherein said bandwidth reduction information is retrieved in a current node or received by signaling from another node.

13. The method according to claim 1, wherein said bandwidth reduction information is retrieved from a table comprising optimal detectors based on statistical analysis.

14. A positioning node in a wireless communication system, said positioning node comprising:
 a receiving unit configured for receiving a positioning measurement from a user equipment in said wireless communication network;
 a retrieving unit configured for retrieving bandwidth reduction information, wherein bandwidth reduction information is retrieved from information configured in the positioning node or received by signaling from another node in the wireless communication system;
 a deviation unit configured for checking said received positioning measurement for a deviation based on said retrieved bandwidth reduction information;
 a managing unit configured for managing said received position measurement based on said deviation; and
 a position determiner configured for determining a position of said user equipment based at least on said managed received position measurement, to provide improved positioning for said user equipment.

15. The arrangement according to claim 14, wherein said deviation unit is configured to detect a deviation if the absolute value of the deviation of the received position measurement is below a predetermined threshold.

16. The arrangement according to claim 15, wherein said deviation unit is configured to detect a deviation if $$abs(RxTx - T - RxTx_{nom}) < threshold$$

where RxTx is the position measurement, T is the number of chips between a first side lobe and a main lobe of a radio frame, $RxTx_{nom}$ is a nominal value for the position measurement without bandwidth reduction, and at least one of T and the threshold depends on the retrieved bandwidth reduction.

17. The arrangement according to claim 14, wherein said managing unit comprises a correction unit configured for correcting said received position measurement based on a determined deviation, and an adapting unit configured for adapting allowed distance values based on said retrieved bandwidth reduction information and said deviation.

18. The arrangement according to claim 17, wherein said correcting unit is configured for applying a correction term to said retrieved position measurement based on said retrieved bandwidth extension information.

19. The arrangement according to claim 18, wherein said correcting unit is configured to apply said correction term according to $$RxTx = RxTx + correction.$$

20. The arrangement according to claim 14, wherein said bandwidth reduction information retrieving unit is configured to retrieve bandwidth reduction information from a table.

21. The arrangement according to claim 17, wherein said adapting unit is configured for replacing a negative distance value received in said position measurement with 0 if said negative distance value is within a predetermined range.

22. A network node comprising a positioning arrangement according to claim 14.

23. The network node according to claim 22, wherein said node is a radio access network node.

24. The network node according to claim 22, wherein said node is a stand alone serving mobile location centre node.

* * * * *